Figure 1:
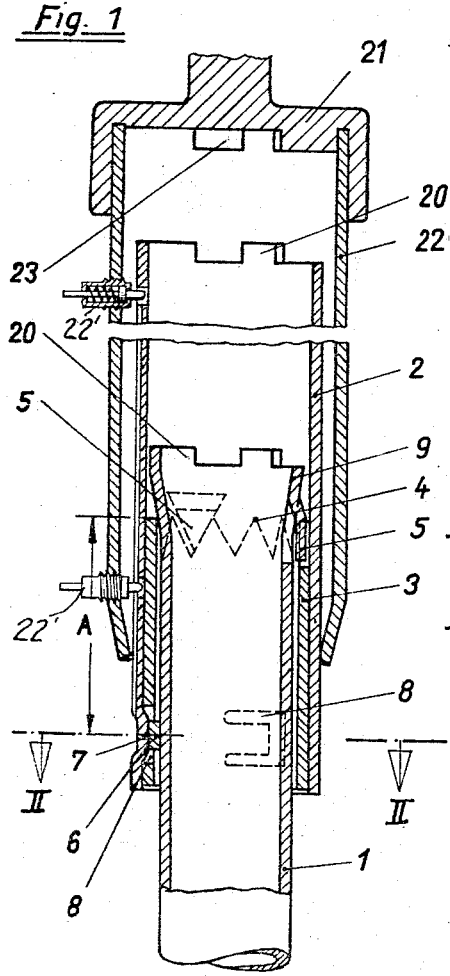

Dec. 20, 1966  S. SCHIANSKY  3,292,956
CLAMPING ARRANGEMENT FOR PIPES
Filed Feb. 1, 1965  2 Sheets-Sheet 1

INVENTOR
SIEGFRIED SCHIANSKY
BY Dicke & Craig
ATTORNEYS

Dec. 20, 1966   S. SCHIANSKY   3,292,956
CLAMPING ARRANGEMENT FOR PIPES
Filed Feb. 1, 1965   2 Sheets-Sheet 2

INVENTOR
SIEGFRIED SCHIANSKY
BY Dicke & Craig
ATTORNEYS

United States Patent Office 3,292,956
Patented Dec. 20, 1966

3,292,956
CLAMPING ARRANGEMENT FOR PIPES
Siegfried Schiansky, Schlierseestrasse 71,
Munich 9, Germany
Filed Feb. 1, 1965, Ser. No. 429,426
8 Claims. (Cl. 287—58)

The present invention relates to an arrangement for clamping together tubular elements adapted to be mutually slidable and rotatable, and more particularly relates to a clamping arrangement for tubularly shaped legs of camera stands, especially of tripods or similar apparatus.

For purposes of clamping mutually slidable and rotatable tubular elements a number of different constructions are known already in the prior art. They are based for the most part in principle on actuating, with the aid of cams or the like, some suitable expanding means during rotation of one of the tubular elements whereby a clamping effect is then achieved by frictional engagement.

All of the rotational clamping arrangements known heretofore involving tubular elements have the serious disadvantage that the clamping effect is based always exclusively only on a force-locking connection of two of the tubular elements which is more or less effective depending on the friction between a tubular element and the respective clamping parts.

In order to avoid this disadvantage, the present invention proposes with the use of a clamping sleeve between the two tubular elements, that the clamping sleeve is form-lockingly connected with one tubular element—for example, by teeth at the end face thereof—and that additionally by rotation of the other tubular element, a force-locking connection of the two tubular elements with each other is achieved by way of cams or the like.

According to a further development of the present invention, the form-locking connection between the clamping sleeve and the one tubular element is established in that one or several projections or nose portions—for example, in the form of pressed-in or pressed-out portions in the walls of the tubular elements—are provided in the one tubular element with which come into engagement the teeth at the end face of the clamping sleeve. The engagement thereby takes place according to the present invention in such a manner that always a small gap remains between the points of the teeth at the clamping sleeve and at the projections provided in the tubular element. In conjunction with the further measure according to the present invention, to construct conically the end of the tubular element at which are accommodated the projections necessary for the form-locking engagement, the points of the clamping sleeve teeth are caused to extend onto a conically tapering annular gap and are wedged therein without play. A connection of the two tubular elements with each other completely free of wobble is created thereby, notwithstanding the play normally necessary and dependent on tolerances.

The tubular connection according to the present invention further distinguishes itself by the fact that the locations of the force-locking connection and the form-locking abutment, which are both located approximately at opposite ends of the clamping sleeve, have a relatively large spacing from one another so that a large clamping base is produced thereby. The fact that the prevailing length of the clamping base can be suitably determined by a choice in the length of the clamping sleeve is of additional advantage.

According to a still further proposal in accordance with the present invention, differing from the construction described so far, the application of a simultaneous form- and force-locking connection takes place in such a manner that an inwardly directed narrow web is arranged at the outer tubular element or an outwardly directed narrow web is arranged at the inner tubular element which extends over the entire length of the tubular element. For purposes of achieving a form-locking connection, the longitudinal slot of the rotatably arranged clamping sleeve thereby engages into this web. The particular advantage accruing to this is that a form-locking connection of the two mutually telescopically slidable tubular elements is achieved in every desired pulled-out position or extended and the telescopically extensible tubular elements can therefore be clamped with each other in every such position.

By the application of a simultaneous form and force-locking connection realized in accordance with the proposals of the present invention, there is achieved, in conjunction with the further measures according to the present invention, with simple means an absolutely reliable connection of two mutually extensible or telescopic tubular elements not attained heretofore in its effectiveness.

The present invention may be applied to the connection of all suitable telescopic mutually slidable and rotatable tubular elements; preferably, however, they are suited for tubularly shaped telescoping legs of stands or tripods for photographic apparatus, projection tables or the like. Of particular advantage is the space-saving construction which makes possible an application of the present invention even with smaller tube diameters. Additionally, with stand legs having several telescopic parts each, there results the advantage from the present invention that during telescopic retraction of the individual parts, that is, when sliding the parts one into the other, no length useful for the extension is lost.

Accordingly, it is an object of the present invention to provide a clamping arrangement for mutually slidable and rotatable tubular elements, particularly telescopic legs of stands for photographic apparatus, which by extremely simple means obviate the aforementioned shortcomings encountered with the prior art constructions.

Another object of the present invention resides in the provision of a clamping arrangement for mutually slidable and rotatable telescopic tubular elements which assures simultaneous force- and form-locking engagement of the various parts.

A further object of the present invention resides in the provision of a clamping arrangement for mutually sildable and rotatable tubular elements which is not only extremely simple in construction, easy to manufacture, and low in cost but at the same time assures a reliable clamping in every position of the telescoping parts thereof.

Still a further object of the present invention resides in a provision of a clamping arrangement for clamping mutually slidable and rotatable tubular elements which assures a safe connection between the parts, completely free of play that would endanger the rigidity of the stand.

Another object of the present invention resides in the provision of a clamping arrangement for mutually slidable and rotatable tubular elements which permits a clamping base of any desired length, that can be readily selected at the will of the designer.

A still further object of the present invention resides in the provision of a clamping arrangement for telescopic tubes of the type described above which achieves an absolutely reliable connection between the parts with an effectiveness unattainable heretofore.

Still a further object of the present invention resides in the provision of a clamping arrangement of the type described above which is of space-saving construction and permits application thereof to tubular elements of even relatively very small diameter.

Figure 3:
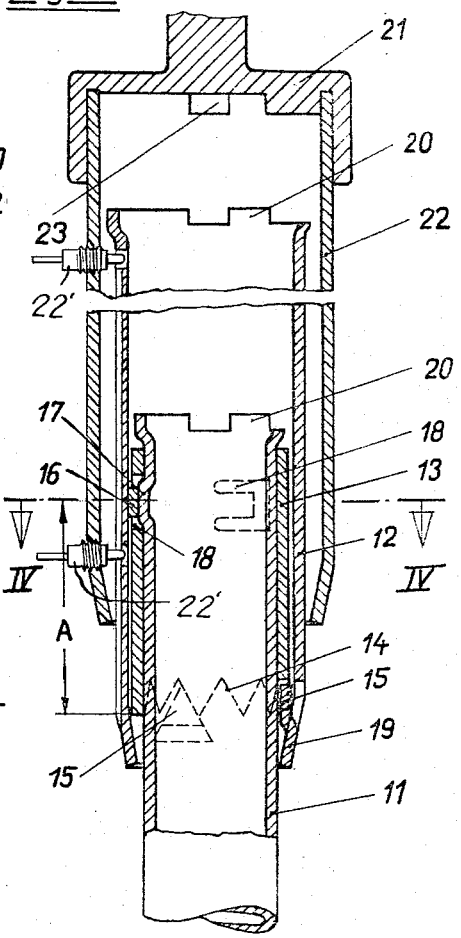
Figure 2:
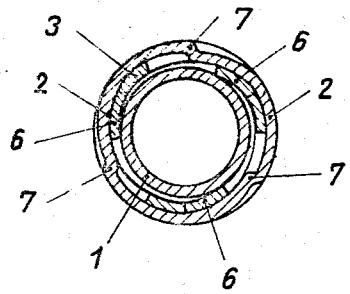
Figure 4:
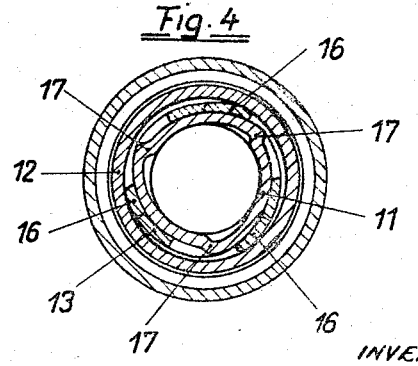
Figure 5:
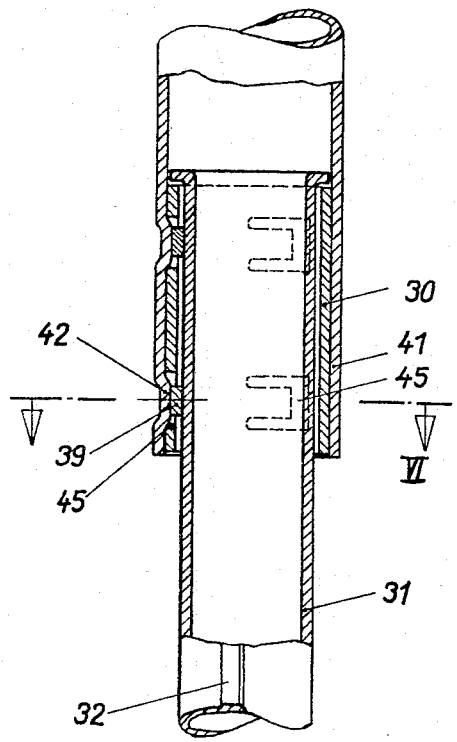
Figure 7:
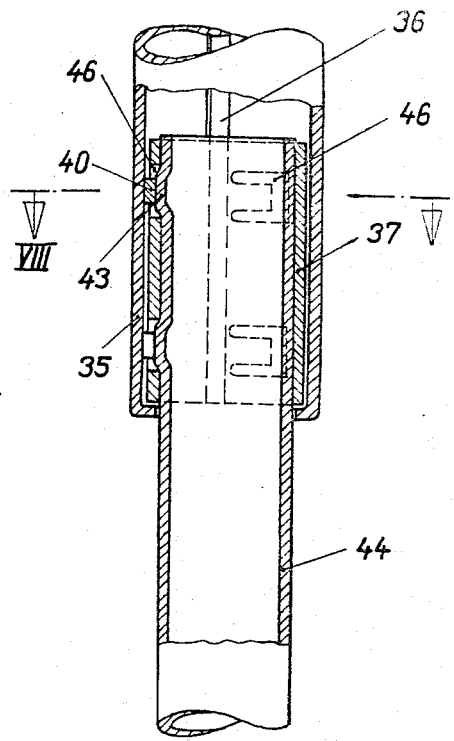
Figure 6:
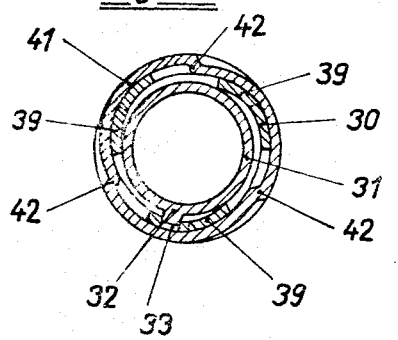
Figure 8:
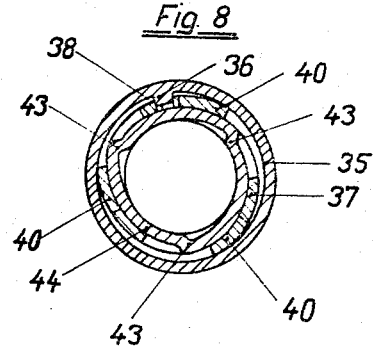

These and further objects, features and advantages of the present invention will become more obvious from the following description when taken in connection with the accompanying drawing which shows, for purposes of illustration only, several embodiments in accordance with the present invention, and wherein:

FIGURE 1 is an axial longitudinal cross-sectional view through a clamping arrangement in accordance with the present invention in which the clamping sleeve is brought into form-locking connection with the inner tubular element, FIGURE 2 is a cross-sectional view taken along line II—II of FIGURE 1, FIGURE 3 is an axial longitudinal cross-sectional view of a modified embodiment of a clamping arrangement in accordance with the present invention in which the clamping sleeve is brought into form-locking connection with the outer tubular element, FIGURE 4 is a cross-sectional view taken along line IV—IV of FIGURE 3, FIGURE 5 is an axial cross-sectional view through a still further modified embodiment of a clamping arrangement in accordance with the present invention having a form-locking connection and provided with an outwardly directed web at the inner tubular element, FIGURE 6 is a cross-sectional view taken along line VI—VI of FIGURE 5, FIGURE 7 is an axial longitudinal cross-sectional view through still another modified embodiment of the clamping arrangement in accordance with the present invention having a form-locking connection and provided with an inwardly directed web at the outer tubular element, and FIGURE 8 is a cross-sectional view taken along line VIII—VIII of FIGURE 7.

Referring now to the drawing wherein like reference numerals are used throughout the various views to designate like parts, and more particularly to FIGURES 1 and 2, a clamping sleeve 3 is arranged between the inner tubular element 1 and the outer tubular element 2 which are mutually slidable and rotatable. The clamping sleeve 3 is secured against movement in the longitudinal direction at the outer tubular element 2 and is adapted to be rotated through a predetermined angle. The clamping sleeve 3 is provided at one end with an end-face toothing 4. Nose portions or projections 5 having an acute angle are arranged at the inner tubular element 1, preferably in the form of tabs, which are pressed outwardly of the tube wall. The projections 5 point with the acute angle thereof toward the end-face toothing 4 at the sleeve 3 and during extension of the inner tubular element into its end position, the projections 5 engage into the teeth 4 and thus establish a form-locking connection between the sleeve 3 and the inner tubular element 1. A suitable number of projections 5 may be provided, distributed along the circumference, appropriately three projections 5 being shown in the present case.

At the end of the clamping sleeve 3 opposite the end-face toothing 4, three springy tongues 6 are provided, for example, distributed over the circumference; cam tracks or cams 7 coordinated to the tongues 6 are accommodated at the outer tubular element 2. During a rotational movement of the tongues 6 in the direction of the cams 7 or vice versa, the tongues 6 are pressed into abutment against the inner tubular element 1 and thus a force-locking clamping connection is established between the two tubular parts. The cams 7 may be advantageously pressed-in into the walls of the tubular element 2.

The tongues are punched out of the sleeve 3 and, in conjunction with each tongue 6, an aperture or cutout 8 may be provided into which extends a respective cam 7, whereby the clamping sleeve 3 is secured in its position in the axial direction on the tubular element 2. The manufacture of the clamping sleeve 3 can take place thereby in a simple and inexpensive manner, for example, such that the sleeve 3 is rolled from a correspondingly semi-finished flat or plate into a subsequently slotted sleeve. In order to obviate any possibility of the sleeve 3 slipping out of the outer tubular element 2, the lower edge of the end face of the latter element may be slightly pressed-in at a few places along the inner circumference thereof.

The form-locking connection between the projections 5 and the end teeth 4 takes place according to the present invention in such a manner that a small gap always remains between the points of the teeth 4 and the projections 5. In conjunction with the further measure proposed in accordance with the present invention that the end 9 of the inner tube 1 is enlarged conically in the outward direction, i.e., is flared conically in the outward direction, the points of the teeth 4 extend into the conically tapering annular gap and are wedged therein without play. Simultaneously during rotation in the clamping direction the clamping tongues 6 at the sleeve 3 are expanded.

In the clamped condition, there is thus created by the present invention a clamping base A whose length is determined by the distance of the plane of the expandable clamping means 6, 7 to the end of the end-face toothing 4. The clamping base A may be suitably determined by the respective length of the clamping sleeve 3 and in every case a connection of the two tubular elements with each other may be achieved which is absolutely free of wobble.

The application in accordance with the present invention of a simultaneous form- and force-locking connection entails the considerable advantage that the clamping connection is not dependent on the magnitude and effect of a frictional engagement as initiating force, but instead a form-locking engagement precedes the exclusively force-locking clamping connection. By reason of the form-locking engagement of the clamping sleeve 3 with the tubular element 1, a fully effective expanding clamping action is achieved in every case.

A clamping arrangement is illustrated in FIGURES 3 and 4 which is the reverse from that of FIGURES 1 and 2. The end teeth 14 at the sleeve 13 engage in this embodiment, for the establishment of a form-locking connection, into projections 15 which are pressed-in into the outer tubular element 12. The expanding clamping action of the sleeve 13 is effectuated by way of springy tongues 16 by means of cams 17 at the inner tubular element 11. The lower end 19 of the outer tubular element 12 is contracted conically for purposes of securing the sleeve 13 without play. The points of the teeth 14 are wedged securely without play within the conical annular gap at the tube end 19. The function of the connection is thereby the same as in the embodiment explained and described in connection with FIGURES 1 and 2.

The clamping of the individual telescopic tubes of a tripod leg thereby takes place in a simple manner such that the largest tube is held fast, then all of the other tubes are completely pulled out and by rotation of the lowermost smallest tube, simultaneously all of the pulled-out or extended tubes are clamped. As shown in FIGURES 1 and 3 the connection between the outermost tubular members 22 and outer tubular member 2, FIGURE 1 and member 12, FIGURE 3 is effected by conventional detent means in the form of selectively manually releasable spring detent members 22′ engaging in apertures in the members 2 and 12, these apertures being connected by groove means for guiding the detent members 22′ upon endwise movement of the members 2 and 12. The detent means just referred to is old and well known, does not form part of applicant's invention and is not being claimed.

For purposes of disengagement of the clamped tubular parts, according to a further feature of the present invention, there is provided at the upper end face of the extensible tubes a crown toothing 20 and in the closure part 21 of the outer tubular element 2 a corresponding counter-toothing 23. The disengagement of the clamped tubular parts of a tripod leg can thereby take place in an advantageous manner such that the outer tubular element 2 is held fast and the next smaller tubular element is unclamped by rotation in the counter-clamping direction and is then pushed-in or retracted. When this tubular element has been completely pushed home, it locks with its crown toothing 20 in the teeth 23 within the closure part 21 and thereupon the next smaller tubular element can be unclamped and retracted or pushed-in, which in turn locks with the crown toothing 20 thereof in the counter-toothing 23; in a similar manner all of such other telescopic tubes as may be desired may be unclamped and retracted or pushed in whereby only the outer tubular element 2 has to be held fast.

FIGURES 5 to 8 illustrate another proposal according to the present invention for the realization of a form-locking connection by reference to two further embodiments; the force-locking connection thereby takes place in the same manner as in the embodiments according to FIGURES 1 to 4.

The form-locking connection between the sleeve 30 and the inner tubular element 31 takes place in the embodiment of FIGURES 5 and 6 in such a manner that an outwardly directed, small web 32 is arranged at the inner tubular element 31, which extends over the entire length of the tube. For purposes of achieving a form-locking connection, the longitudinal slot 33 constituted by the clamping sleeve 30 engages with the web 32.

In the embodiment according to FIGURES 7 and 8 there is arranged for the form-locking connection at the outer tubular element 32 in an inwardly directed small web 36 which also extends over the entire length of the tube and engages in the longitudinal slot 38 constituted by the clamping sleeve 37.

With these constructions of the form-locking connection, there is achieved the advantage that in every extended position a form-locking engagement exists and the tubular elements can thus be clamped to each other in any desired position.

The force-locking clamping connection as well as the position-securing means of the clamping sleeve thereby takes place in the same form as has already been described in detail in connection with FIGURES 1 to 4. The springy tongues 39 at the sleeve 30 and the tongues 40 at the sleeve 37 thereby serve for this purpose. The tongues 39 and 40 are thereby expanded or spread during rotation of the respective tubular element by way of cams 42 arranged along the periphery of the outer tubular element 41 or by way of cams 43 arranged at the inner tubular element 44.

While I have shown and described several embodiments in accordance with the present invention, it is understood that the same is not limited thereto but is susceptible of numerous changes and modifications as known to a person skilled in the art. For example, for purposes of the force-locking clamping connection, in addition to the constructions shown in the drawings, also any other known appropriate construction may find useful application with the present invention which cause expansion of clamping means upon rotation thereof.

Thus, it is obvious that the present invention is not limited to the details shown and described herein but is susceptible of numerous changes and modifications, and I therefore do not wish to be limited to the details shown and described herein but intend to cover all such changes and modifications as are encompassed by the scope of the appended claims.

I claim:

1. An arrangement for clamping two mutually slidable and rotatable tubular elements especially for photographic apparatus, comprising
   at least two tubular members arranged for telescopic movement relative to one another,
   a clamping sleeve member rotatably disposed between said telescopic tubular members, said clamping sleeve member being also secured in the axial direction in position between said telescopic tubular members,
   interengageable male and female locking means, one of said locking means being disposed on the first of said telescopic tubular members and the other of said locking means being disposed on said clamping sleeve member in such a position as to be engaged or released upon relative axial movement between said first telescopic tubular member and said clamping sleeve member, said male and female locking means being so shaped that when engaged they provide a torque transmitting connection between said clamping sleeve member and said first telescopic tubular member, and force locking connecting means including at least one cam surface disposed on the other telescoping tubular member and springy tongue means disposed on said clamping sleeve member adjacent to said cam surface, said cam surface and said springy tongue means upon rotation of said clamping sleeve member providing a force-locking connection between the two telescopic tubular members.

2. The combination according to claim 1, wherein said first telescopic tubular member is the innermost telescopic tubular member and is flared conically at the upper end thereof and forms together with the other of said two telescopic tubular members a conically tapering annular gap, said torque transmitting connection extending into said gap.

3. The combination according to claim 1, wherein the other telescopic tubular member is the outermost of said two telescopic tubular members and is conically contracted at the lower end thereof and forms together with said first telescopic tubular member a conically tapering annular gap, said torque transmitting connection extending into said gap.

4. An arrangement for clamping two mutually slidable and rotatable tubular elements, especially for tubularly shaped legs of stands for photographic apparatus, comprising
   at least two tubular means in telescopic interrelationship,
   clamping sleeve means rotatably disposed between said tubular means, said clamping sleeve means being also secured in the axial direction in its position between said tubular means,
   form-locking connecting means providing a form-locking connection between one end of said clamping sleeve means and one of said two tubular means,
   and force-locking connecting means providing a force-locking connection between said tubular means upon rotation of the other tubular means,
   said form-locking connecting means including at least one projection near the upper end of the inner tubular means which extends outwardly, said sleeve means being arranged at the lower end of the outer tubular means and being secured in the axial direction on said outer tubular means while being rotatable relative thereto through a pre-determined angle, the upper end face of said sleeve means being provided at least in part with toothing means adapted to cooperate with said one projection,
   and said force-locking connecting means including a plurality of springy tongue means provided at the other end of said clamping sleeve means, and cam means at the circumference of the outer tubular means for expanding said tongue means.

5. An arrangement for clamping two mutually slidable and rotatable tubular elements, especially for tubularly shaped legs of stands for photographic apparatus, comprising
   at least two tubular means in telescopic interrelationship,
   clamping sleeve means rotatably disposed between said tubular means, said clamping sleeve means being also secured in the axial direction in its position between said tubular means,
   form-locking connecting means providing a form-locking connection between one end of said clamping sleeve means and one of said two tubular means, and force-locking connecting means providing a force-locking connection between said tubular means upon rotation of the other tubular means, said form-locking connecting means including at least one projection near the lower end of the outer tubular means which projects inwardly, said sleeve means being arranged at the upper end of the inner tubular means and being secured in the axial direction on said inner tubular means while being rotatable relative thereto through predetermined angle, the lower end face of said sleeve means being provided at least partly with toothing means adapted to cooperate with said one projection, said force-locking connecting means including a plurality of tongue means at the other end of said sleeve means along the circumference thereof, and cam means arranged along the circumference of said inner tubular means for expanding said tongue means.

6. An arrangement for clamping two mutually slidable and rotatable tubular elements especially for tubularly shaped legs of stands for photographic apparatus, comprising at least two tubular means in telescopic interrelationship, clamping sleeve means rotatably disposed between said tubular means, said clamping sleeve means being also secured in the axial direction in its position between said tubular means, form-locking connecting means providing a form-locking connection between said clamping sleeve means and one of said two tubular means, and force-locking connecting means providing a force-locking connection between said tubular means upon rotation of the other tubular means, each extensible tubular means being provided at the upper end face thereof with crown toothing means, a closure part at the outer tubular means and provided with countertoothing means, the crown toothing means at the end face of a respective tubular means engaging in the fully retracted position thereof with said counter-toothing means.

7. An arrangement for clamping two mutually slidable and rotatable tubular elements, especially for tubularly shaped legs of stands for photographic apparatus comprising two tubular means in telescopic interrelationship, clamping sleeve means rotatably disposed between said tubular means, said clamping sleeve means being also secured in the axial direction in its position between said tubular means, form-locking connecting means providing a form-locking connection between said clamping sleeve means and one of said two tubular means, and force-locking connecting means providing a force-locking connection between said tubular means upon rotation of the other tubular means, said form-locking connecting means including a radially directed web means at one of said tubular means and extending substantially over the entire length thereof, said clamping sleeve means forming effectively a longitudinal slot, and said web means engaging in said slot for establishing a form-locking connection, said force-locking means including a plurality of springy tongue means at each end of the clamping sleeve means and cam means at one of said tubular means for expanding said tongue means.

8. An arrangement for clamping two mutually slidable and rotatable tubular elements, especially for tubularly shaped legs of stands for photographic apparatus, comprising two tubular means in telescopic interrelationship, clamping sleeve means rotatably disposed between said tubular means, said clamping sleeve means being also secured in the axial direction in its position between said tubular means, form-locking connecting means providing a form-locking connection between said clamping sleeve means and one of said two tubular means, and force-locking connecting means providing a force-locking connection between said tubular means upon rotation of the other tubular means, said form-locking connecting means including a radially directed web means at one of said tubular means and extending substantially over the entire length thereof, said clamping sleeve means forming effectively a longitudinal slot, and said web means engaging in said slot for establishing a form-locking connection, said force-locking means including a plurality of springy tongue means at each end of the clamping sleeve means and cam means at one of said tubular means for expanding said tongue means, a cutout portion being provided in said sleeve means in conjunction with said tongue means, into which extend the cam means provided at said one tubular means.

References Cited by the Examiner
UNITED STATES PATENTS

| | | | |
|---|---|---|---|
| 2,103,586 | 12/1937 | Kitchel et al. | 285—143 |
| 2,391,101 | 12/1945 | Odin. | |
| 2,806,723 | 9/1957 | Fairclough. | |
| 2,884,270 | 4/1959 | Carlberg. | |
| 2,989,329 | 6/1961 | Noah. | |
| 2,991,096 | 7/1961 | Davidson. | |

CARL W. TOMLIN, *Primary Examiner.*

T. A. LISLE, *Assistant Examiner.*